April 13, 1926.

W. P. REMSBURG 1,581,017

TRUCK FOR CULTIVATORS

Filed August 31, 1925      2 Sheets-Sheet 2

William P. Remsburg
INVENTOR

BY Victor J. Evans
ATTORNEY

WITNESS: Gerald Hennesy Jr.

Patented Apr. 13, 1926.

1,581,017

UNITED STATES PATENT OFFICE.

WILLIAM P. REMSBURG, OF ADAZA, IOWA.

TRUCK FOR CULTIVATORS.

Application filed August 31, 1925. Serial No. 53,701.

*To all whom it may concern:*

Be it known that I, WILLIAM P. REMSBURG, a citizen of the United States, residing at Adaza, in the county of Greene and State of Iowa, have invented new and useful Improvements in Trucks for Cultivators, of which the following is a specification.

The object of this invention is to provide a truck especially adapted for use with various commercial types of two-row cultivators, the device being adapted to regulate the depth of the plow, facilitate the applying of corn where the rows are not straight and permit of the use of four horses instead of the three horses frequently employed.

A further object is to eliminate neck draft, and to produce a truck having a maximum degree of efficiency.

With the foregoing and other objects in view, the invention consists in the novel construction and arrangement of elements described, illustrated and claimed, it being understood that modifications may be made within the scope of the claims without departing from the spirit of the invention.

In the drawings forming part of this application:

Figure 1:
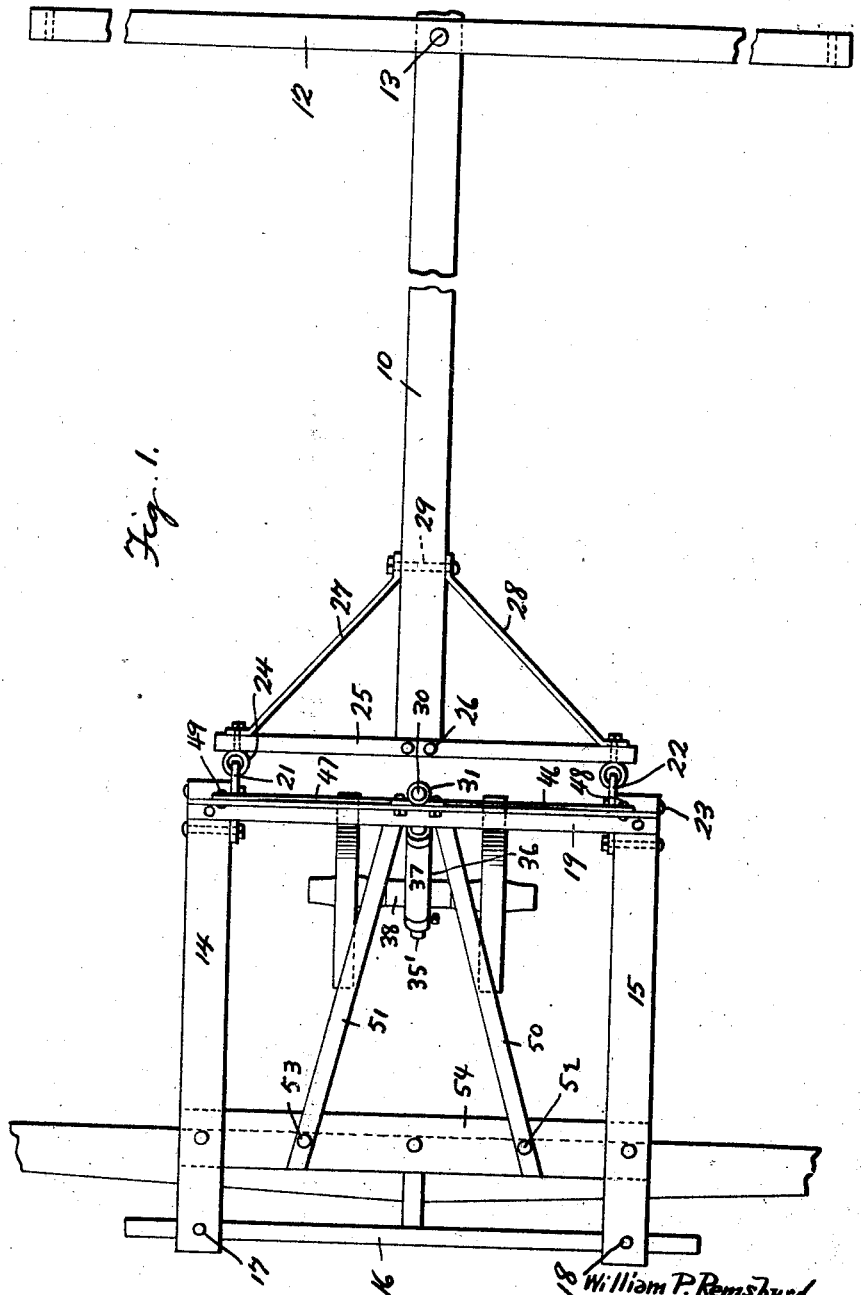
Figure 1 shows the device in top plan.

In Figure 1 the tongue is designated 10, and a neck yoke or the like is shown conventionally being represented by the cross bar 12, secured at the point 13. A frame includes side elements 14 and 15, constituting side bars, a rear transverse bar 16 secured at 17 and 18 to bars 14 and 15, and a front bar also secured to the side bars.

Connected with the forward ends of bars 14 and 15 are plates or the like designated 21 and 22 secured by bolts 23 passing through the side bars. These plates or the like 21 and 22 are apertured, and each receives an eye bolt such as 24 adapted to effect connection with the draft element 25 extending transversely of the frame, and connected at 26 with tongue 10. The usual braces or the like are shown at 27 and 28 and are connected with the tongue at 29.

Figure 2:
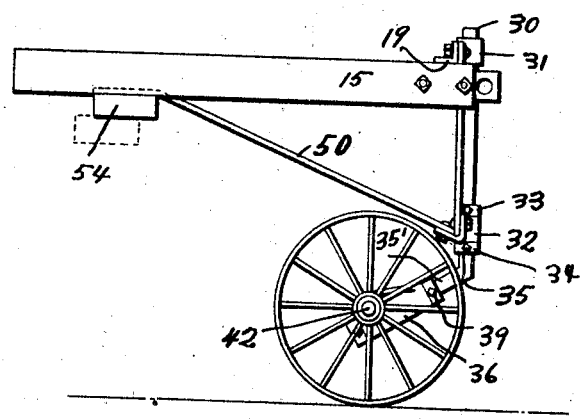
Figure 2 is a side elevation of the main portion of the structure.

A vertical shaft or standard is designated 30 and at its upper portion is retained by a two-part bearing element or box 31 connected with bar 19 in the manner shown in Figure 2. A lower two-part box is designated 32, and is held between collars 33 and 34 by means of set screws 35, the adjustment of the screws and box permitting of the vertical movement of the standard or shaft 30.

Figure 3:
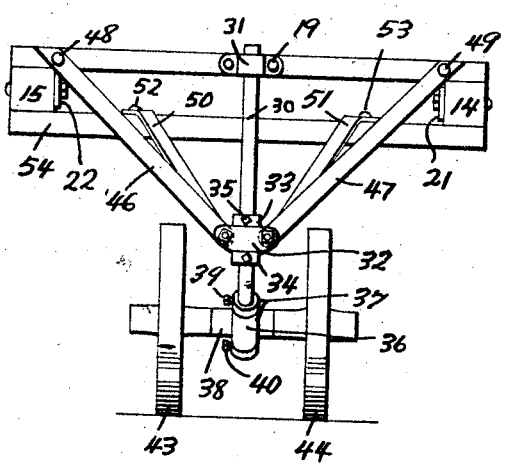
Figure 3 is a front elevation.

Element 30 has a deflected lower end 35, the deflected portion extending downwardly and rearwardly and being received by mounting means comprising a tubular element 36 having a transverse bore and having a bore extending at an angle therewith as illustrated especially in Figure 3. The perpendicularly extending portions of this device 36, which provide the bores, are designated respectively 37 and 38, and set screws 39 and 40 retain the bearing device 36 in an adjusted position with reference to the deflected portion 35 of the standard 30.

A main axle 42 passes through the bore of element 38, and is carried by ground wheels 43 and 44.

The box 32 is provided with outwardly extending ears for connection with braces 46 and 47 secured at 48 and 49, and other braces 50 and 51 are secured at points 52 and 53 on transverse element 54.

Having thus described the invention, what is claimed as new, is:—

1. A device of the class described, comprising spaced side bars, draft devices connected with the forward portions of the bars, draft means connected with the rear portions of said bars and extending laterally therefrom, a standard including a lower rearwardly deflected portion and a vertical portion, the vertical portion being adjustable vertically with reference to the side bars, draft means, ground wheels, and an axle therefor, and means for mounting the axle on the deflected portion of the standard, these means comprising an element having a bore extending transversely thereof for receiving the axle, a bore extending upwardly and forwardly with reference to the axle, means retaining the vertical standard in an adjusted and fixed position with reference to the side bars, and means for retaining the lower deflected portion of the standard in an adjusted position with reference to the axle and the ground wheels.

2. A device of the class described, comprising spaced side bars, draft devices connected with the forward portions of the bars, draft means connected with the rear portions of said bars and extending laterally therefrom, a standard including a lower rearwardly deflected portion and a vertical portion, the vertical portion being adjustable vertically with reference to the side bars, draft means, ground wheels, and an axle therefor, and means for mounting the axle on the deflected portion of the standard, these means comprising an element having a bore extending transversely thereof for receiving the axle, a bore extending upwardly and forwardly with reference to the axle, means retaining the vertical standard in an adjusted and fixed position with reference to the side bars, means for retaining the lower deflected portion of the standard in an adjusted position with reference to the axle and the ground wheels, said means last named including a connecting element having bores extending transversely thereof.

In testimony whereof I affix my signature.

WILLIAM P. REMSBURG.